(12) United States Patent
Itakura

(10) Patent No.: US 9,363,218 B2
(45) Date of Patent: Jun. 7, 2016

(54) INFORMATION PROCESSING DEVICE, INFORMATION PROCESSING SYSTEM AND COMPUTER-READABLE STORAGE MEDIUM

(71) Applicant: CASIO COMPUTER CO., LTD., Shibuya-ku, Tokyo (JP)

(72) Inventor: Katsuyuki Itakura, Hamura (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 0 days.

(21) Appl. No.: 14/982,203

(22) Filed: Dec. 29, 2015

(65) Prior Publication Data

US 2016/0134569 A1     May 12, 2016

Related U.S. Application Data

(62) Division of application No. 13/709,464, filed on Dec. 10, 2012.

(30) Foreign Application Priority Data

Dec. 16, 2011    (JP) ................................. 2011-275624

(51) Int. Cl.
    *G06F 15/16*      (2006.01)
    *H04L 12/58*      (2006.01)
    (Continued)

(52) U.S. Cl.
    CPC ................ *H04L 51/18* (2013.01); *G06Q 30/00* (2013.01); *G06Q 30/02* (2013.01)

(58) Field of Classification Search
    CPC ...... H04L 51/18; G06F 9/4843; G06Q 20/04; G06Q 20/12; G06Q 30/02; G06Q 30/06
    See application file for complete search history.

(56) References Cited

U.S. PATENT DOCUMENTS 6,003,070 A    12/1999   Frantz
7,023,974 B1 *   4/2006   Brannam ................ H03M 7/30
                                                                               379/88.17

(Continued)

FOREIGN PATENT DOCUMENTS

JP       08-204843     8/1996
JP      2000-047955     2/2000

(Continued)

OTHER PUBLICATIONS

Japanese Office Action for Japanese Application No. 2011-275624 mailed on Nov. 1, 2013.

(Continued)

*Primary Examiner* — Jonathan Bui
(74) *Attorney, Agent, or Firm* — Amin, Turocy & Watson LLP; Gregory Turocy

(57) ABSTRACT

An information processing device of the present invention includes a connecting section which connects application modules capable of performing application processing, a receiving section which receives an electronic mail including a command transmitted from a terminal device, an interpreting section which interprets the command included in the electronic mail received by the receiving section, a designating section which designates, from among the application modules connected by the connecting section, an application module corresponding to the command interpreted by the interpreting section as the execution destination of the command, an acquiring section which acquires a processing result of processing performed by the application module designated by the designating section, and a transmitting section which creates a response electronic mail with the processing result acquired by the acquiring section as a response, and transmits the response electronic mail to the terminal device.

11 Claims, 11 Drawing Sheets

(51) Int. Cl.
*G06Q 30/00* (2012.01)
*G06Q 30/02* (2012.01)

(56) References Cited

U.S. PATENT DOCUMENTS

| | | | |
|---|---|---|---|
| 7,325,035 | B1 | 1/2008 | Arnold |
| 7,412,487 | B2 * | 8/2008 | Caughey ............... H04L 51/24 709/203 |
| 7,536,318 | B1 * | 5/2009 | Wolfe ............... G06Q 30/0609 705/26.35 |
| 2001/0003827 | A1 | 6/2001 | Shimamura |
| 2002/0019851 | A1 | 2/2002 | Pollack |
| 2004/0019643 | A1 | 1/2004 | Zirnstein, Jr. |
| 2004/0059804 | A1 | 3/2004 | Goto |
| 2005/0193074 | A1 | 9/2005 | Garland |
| 2007/0244977 | A1 * | 10/2007 | Atkins ............... G06Q 10/107 709/206 |
| 2008/0162364 | A1 | 7/2008 | Martin et al. |
| 2008/0216092 | A1 * | 9/2008 | Serlet ............... H04L 51/02 719/315 |
| 2010/0070419 | A1 | 3/2010 | Vadhri |
| 2010/0217806 | A1 | 8/2010 | Khot et al. |
| 2012/0054289 | A1 | 3/2012 | Aytulu et al. |
| 2013/0030867 | A1 * | 1/2013 | Wagner ............... G06Q 30/02 705/7.32 |

FOREIGN PATENT DOCUMENTS

| | | |
|---|---|---|
| JP | 2001-318866 | 11/2001 |
| JP | 2001-356922 | 12/2001 |
| JP | 2006-099494 | 4/2006 |

OTHER PUBLICATIONS

Japanese Office Action for Japanese Application No. 2011-275624 mailed on Jun. 4, 2014.
Non-Final Office Action for U.S. Appl. No. 13/709,464 dated Nov. 28, 2014.
Japanese Office Action for Japanese Application No. 2011-275624 mailed on Dec. 11, 2014.
Final Office Action for U.S. Appl. No. 13/709,464 dated Apr. 29, 2015.
Advisory Action for U.S Patent Appl. No. 13/709,464 dated Jul. 29, 2015, 16 pages.
Non-Final Office Action for U.S. Appl. No. 13/709,464 dated Oct. 1, 2015, 15 pages.

* cited by examiner

FIG. 4A

MT MODULE MANAGEMENT TABLE

| MODULE NAME (TYPE) | ADDRESS | OTHER |
|---|---|---|
| SALES | * * * * | * * * * |
| CUSTOMER | * * * * | * * * * |
| RESERVATION | * * * * | * * * * |
| ⋮ | ⋮ | ⋮ |

FIG. 4B

UT USER MANAGEMENT TABLE

| USER NAME | MAIL ADDRESS | COMMAND EXECUTION AUTHORIZATION | PASSWORD |
|---|---|---|---|
| * * * * | * * * * | * * * * | * * * * |
| * * * * | * * * * | * * * * | * * * * |
| ⋮ | ⋮ | ⋮ | ⋮ |

FIG. 5

COMMAND SYNTAX EXAMPLES (1)  Sales. Flash. Report (2)  Customer. Flash. Report (3)  Reserve. Flash. Report (4)  Sales. Detail. Report (5)  Customer. Detail. Report (6)  Reserve. Detail. Report (7)  Sales. Detail. Report | ○○

"|" PIPE   ○○: PREDETERMINED DOCUMENT FORMAT (8)  Item. Plu < PLU. TXT

" < " REDIRECT

FIG. 6

DT PROCESSING MANAGEMENT TABLE

DT1 PROCESSING MANAGEMENT TABLE (Sales)

| COMMAND | PROCESSING TO BE PERFORMED |
|---|---|
| Flash. Report | * * * * |
| Detail. Report | * * * * |
| . : | * * * * |

DT2 PROCESSING MANAGEMENT TABLE (Customer)

| COMMAND | PROCESSING TO BE PERFORMED |
|---|---|
| Flash. Report | * * * * |
| Detail. Report | * * * * |
| . : | * * * * |

DT3 PROCESSING MANAGEMENT TABLE (Reserve)

| COMMAND | PROCESSING TO BE PERFORMED |
|---|---|
| Flash. Report | * * * * |
| Detail. Report | * * * * |
| . : | * * * * |

INFORMATION PROCESSING DEVICE, INFORMATION PROCESSING SYSTEM AND COMPUTER-READABLE STORAGE MEDIUM

CROSS-REFERENCE TO RELATED APPLICATIONS

This application is a Division of application Ser. No. 13/709,464 filed on Dec. 10, 2012, the entire contents of which is incorporated herein by reference.

This application is based upon and claims the benefit of priority from the prior Japanese Patent Application No. 2011-275624, filed Dec. 16, 2011, the entire contents of which is incorporated herein by reference.

BACKGROUND OF THE INVENTION

1. Field of the Invention

The present invention relates to an information processing device, an information processing system and a computer-readable storage medium.

2. Description of the Related Art

Generally, stores attempt to attract more customers and increase sales by changing products in the stores and changing how they provide services (such as discount products and bargain days) as sales promotion activities and sales strategy, taking into consideration various circumstances, such as the moves of their competing stores, changes in their clientele, the availability of reservations and the number of new customers. However, people responsible for or involved in these measures do not necessarily always know the current sales status (operation status) of their stores. When they are away from the store on business, they make an inquiry regarding the current sales status by calling the store or using the electronic mail function of their mobile terminal devices. When this inquiry is made, the store side checks the current sales status tabulated and managed in a sales data processing device, such as an Electronic Cash Register (ECR) or a Point of Sale (POS) terminal, and gives a response to the inquiry by verbal notification, or by copying the current sales status into a reply electronic mail.

Conventionally, as a technology for giving an immediate automatic response to an inquiry using electronic mail, a technology is disclosed where a database is searched and an automatic response is given (electronic mail automatic response system) (refer to Japanese Patent Application Laid-Open (Kokai) Publication No. 08-204843). By using an electronic mail automatic response system such as this to send a current sales status by a reply electronic mail, the creation and transmission of a reply electronic mail can be automatically performed and the convenience can be improved.

However, in the above-described technology in Japanese Patent Application Laid-Open (Kokai) Publication No. 08-204843, the inquiry contents are fixed and the type of the database and the contents thereof are also fixed. Therefore, there is a problem in terms of flexible responsiveness. Accordingly, this technology is not adequate for use in sales promotion activities and sales strategy for attracting more customers and increasing sales by, for example, changing products in the store and the way of providing services (such as discount products and bargain days), taking into consideration various circumstances, such as the moves of its competing stores, changes in its clientele, the availability of reservations and the number of new customers.

SUMMARY OF THE INVENTION

An object of the present invention is to actualize flexible response to an inquiry using electronic mail.

In order to achieve the above-described object, in accordance with one aspect of the present invention, there is provided an information processing device comprising: a connecting section which connects application modules capable of performing application processing; a receiving section which receives an electronic mail including a command transmitted from a terminal device; an interpreting section which interprets the command included in the electronic mail received by the receiving section; a designating section which designates, from among the application modules connected by the connecting section, an application module corresponding to the command interpreted by the interpreting section as an execution destination of the command; an acquiring section which acquires a processing result of processing performed by the application module designated by the designating section; and a transmitting section which creates a response electronic mail with the processing result acquired by the acquiring section as a response, and transmits the response electronic mail to the terminal device.

In accordance with another aspect of the present invention, there is provided a non-transitory computer-readable storage medium having stored thereon a program that is executable by a computer, the program being executable by the computer to perform functions comprising: processing for connecting application modules capable of performing application processing; processing for receiving an electronic mail including a command transmitted from a terminal device, processing for interpreting the command included in the received electronic mail; processing for designating, from among the connected application modules, an application module corresponding to the interpreted command as an execution destination of the command; processing for acquiring a processing result of processing performed by the designated application module; and processing for creating a response electronic mail with the acquired processing result as a response, and transmitting the response electronic mail to the terminal device.

In accordance with another aspect of the present invention, there is provided an information processing system including a terminal device that transmits electronic mail and an information processing device connected to the terminal device via a network, comprising: a connecting section which connects application modules capable of performing application processing; a receiving section which receives an electronic mail including a command transmitted from the terminal device; an interpreting section which interprets the command included in the electronic mail received by the receiving section; a designating section which designates, from among the application modules connected by the connecting section, an application module corresponding to the command interpreted by the interpreting section as an execution destination of the command; an acquiring section which acquires a processing result of processing performed by the application module designated by the designating section; and a transmitting section which creates a response electronic mail with the processing result acquired by the acquiring section as a response, and transmits the response electronic mail to the terminal device.

According to the present invention, flexible response to an inquiry using electronic mail can be actualized, which is very effective for business promotion and strategies.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 4A is a diagram for describing a module management table MT, and FIG. 4B is a diagram for describing a user management table UT;

FIG. 5 is a diagram showing a listing of command syntax examples entered into the text body of an electronic mail;

FIG. 6 is a diagram of processing management tables DT that are referenced by a command processing section CM in application modules 23;

FIG. 7 is a flowchart for describing operations of a command reception function 21 which are started in response to power being turned ON;

FIG. 8 is a flowchart for describing operations of the command processing section CM in the application modules 23 which are started in response to power being turned ON;

FIG. 9 is a flowchart for describing operations of a module control function 22 which are started in response to power being turned ON;

FIG. 10 is a flowchart for describing operations of a command response function 24 which are started in response to power being turned ON.

DETAILED DESCRIPTION OF THE PREFERRED EMBODIMENTS

An embodiment of the present invention will hereinafter be described with reference to FIG. 1 to FIG. 11.

Figure 1:
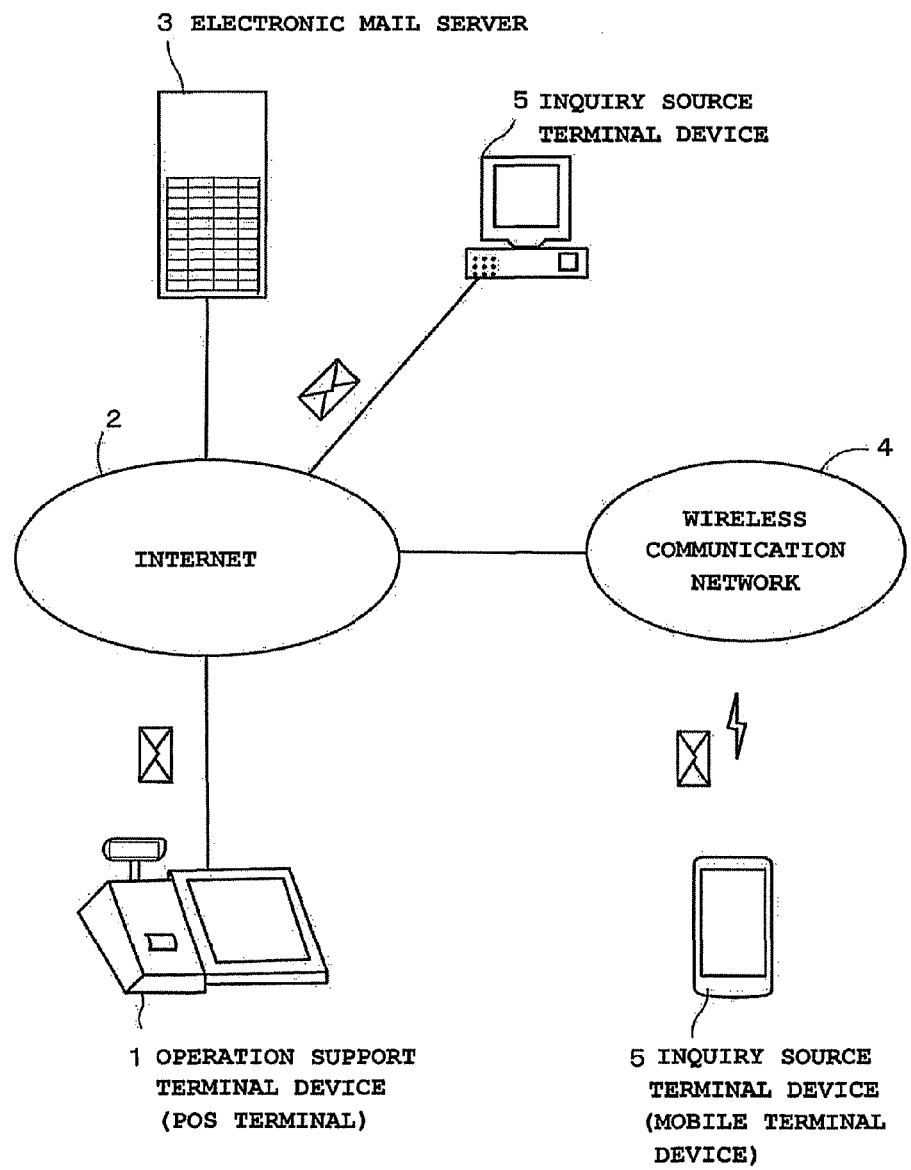
FIG. 1 is a block diagram of an information processing system.

FIG. 1 is a block diagram of an information processing system.

The core of the information processing system is an information processing device 1 that is a sales data processing device such as an ECR or a POS terminal, and includes an electronic mail function for transmitting and receiving electronic mail, an Internet connection function (web access function) and the like, in addition to basic functions such as the registration of sales data for each transaction and closing processing performed when the registration of a transaction is completed. This information processing device 1 can be connected to an electronic mail server 3 via the Internet (computer network and public phone network) 2.

The information processing device 1 is also connected to a wireless communication network (mobile communication network) 4 via broadband Internet 2 and is capable of using a mobile communication system actualizing high-speed and high-volume communication. A terminal device 5 of FIG. 1 that makes an inquiry regarding operation status to the information processing device 1 is a desktop Personal Computer (PC), a mobile terminal device and the like including an electronic mail function. In a case where the terminal device 5 is a desktop PC, the terminal device 5 is connected to the information processing device 1 via the Internet 2. In a case where the terminal device 5 is a mobile terminal device, the terminal device 5 is connected to the information processing device 1 via the wireless communication network 4 and the Internet 2. This terminal device 5 is a device for a person responsible for or involved with a store and is used to make inquiries regarding operation status by electronic mail. When making an inquiry, a person responsible for or involved with a store enters a command indicating the inquiry contents into the text body of an electronic mail and transmits the electronic mail. Note that the inquiries regarding operation status herein has a broad meaning and includes questions and instructions, in addition to inquiries related to business (such as store operations).

Figure 2:
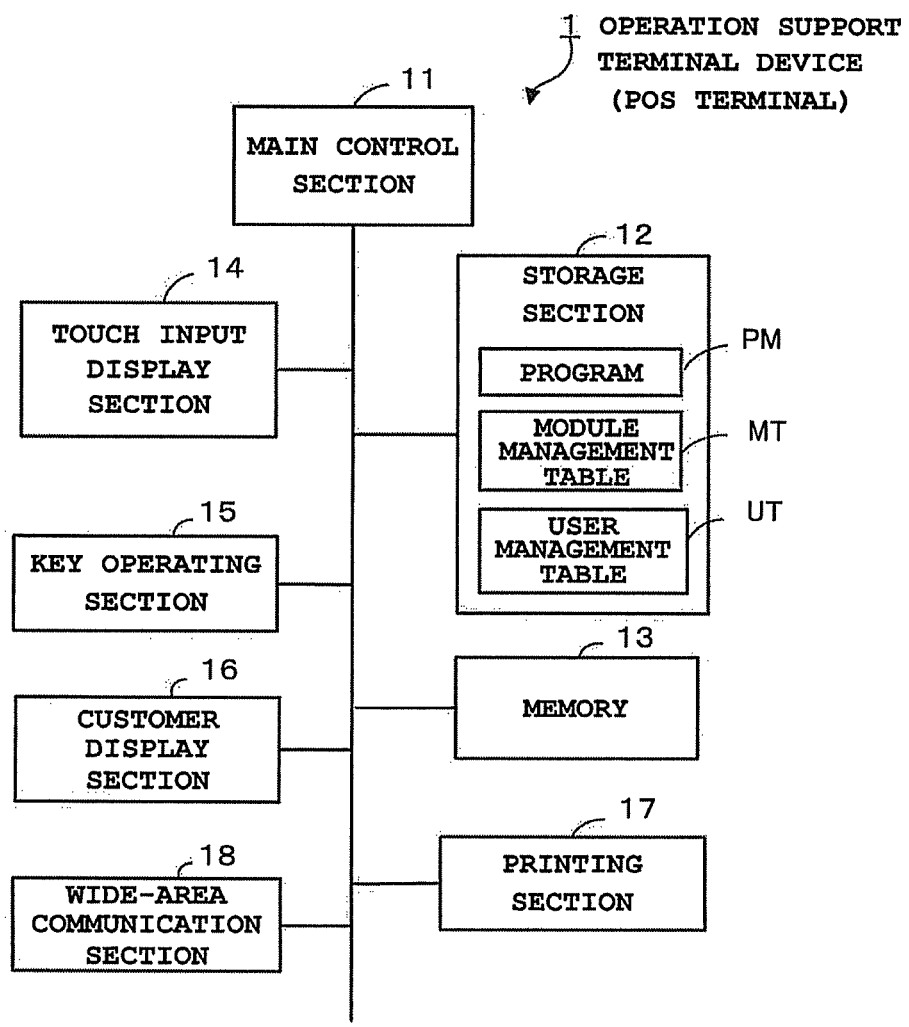
FIG. 2 is a block diagram showing basic components of an information processing device 1.

FIG. 2 is a block diagram showing basic components of the information processing device 1.

The information processing device 1 (such as a POS terminal or a cash register) whose core is a main control section 11 includes a Central Processing Unit (CPU) that controls the overall operation of the information processing device 1 in accordance with various programs, a memory, etc. A storage section 12 in FIG. 2 includes a storage medium, such as a Read-Only Memory (ROM), a Random Access Memory (RAM) or a flash memory, and a drive system thereof, as well as a program memory PM that stores programs and various applications for actualizing the present embodiment based on operation procedures shown in FIG. 7 to FIG. 10, a module management table MT, a user management table UT, and the like described hereafter.

Note that the above-described storage medium is not limited to an internal storage medium provided in a fixed manner, and may be a removable portable external storage medium. In addition, the programs and data may be installed via a wired transmission path or a wireless transmission path from another device. Alternatively, programs and data stored and managed by a server on a network may be accessed and used. A memory 13 in FIG. 2 is a work area that temporarily stores various data required to operate the information processing device 1, such as clock data and flag data.

The main control section 11 has a touch input display section 14, a key operating section 15, a customer display section 16, a printing section 17, a wide-area communication section 18, and the like connected thereto via a bus line as peripheral input and output devices. These components are controlled by the main control section 11 in accordance with an input and output program.

The touch input display section 14 includes a display panel and a touch panel (not shown). The touch panel is arranged on the front surface of the high-definition display panel, and software keys (touch keys) are allocated and arranged in the touch input display section 14. This touch input display section 14 displays function names, an operator confirmation screen, a work screen, etc. Also, this touch input display section 14 senses a touch operation performed by a finger or the like and inputs data based on the touch operation.

The key operating section 15 has various push-button keys (such as a power key). The customer display section 16 displays product prices, subtotals, and the like that are registered as sales. The printing section 17 is, for example, a non-impact printer such as a thermal transfer printer or an inkjet printer, or a dot-matrix printer, and prints out receipts. The wide-area communication section 18 is a communication interface that is connected to broadband Internet 2, and transmits and receives electronic mail to and from the electronic mail server 3.

Figure 3:
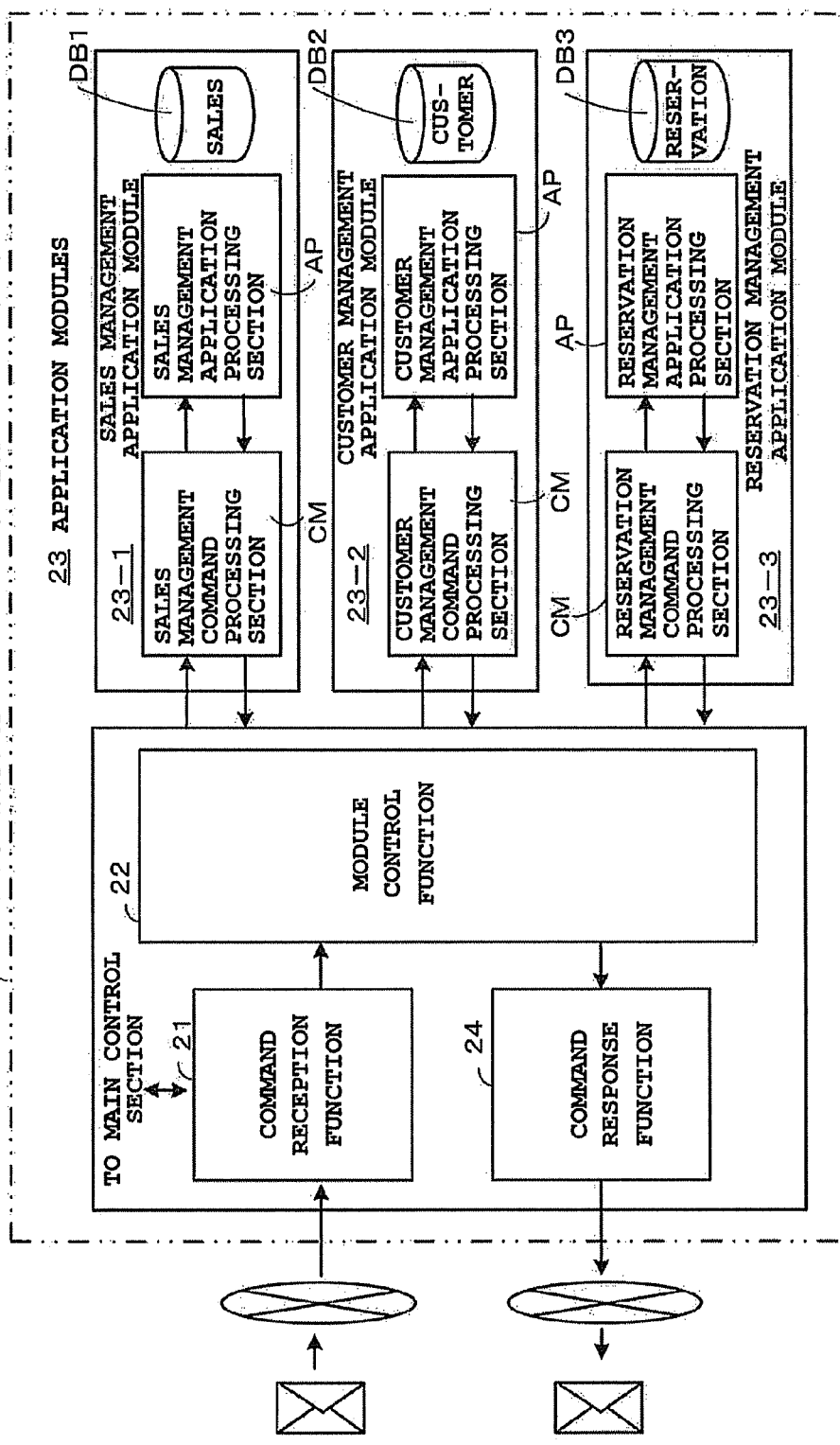
FIG. 3 is a diagram for illustrating and describing the characteristic function (electronic mail automatic response function) of the information processing device 1.

FIG. 3 is a diagram for illustrating and describing a characteristic function (electronic mail automatic response function) of the information processing device 1.

The information processing device 1 includes an electronic mail automatic response function 20 as a characteristic function according to the present embodiment. When an inquiry by electronic mail is received from the terminal device 5 which makes inquiries regarding operation status, the information processing device 1 performs automatic response by interpreting a command (inquiry contents) entered into the electronic mail, performing application processing based on the command, creating a reply electronic mail including a result of the processing and transmitting the reply electronic mail to the terminal device 5. The electronic mail automatic response function 20 is configured to include a command reception function 21, a module control function 22, various application modules 23 and a command response function 24 as functional blocks.

When an electronic mail is transmitted from the terminal device 5 via the Internet 2 and the wide area communication section 18, the command reception function 21 receives the electronic mail on a condition that the electronic mail includes a command and the mail address is an address having access authorization set in advance. In this instance, the command reception function 21 judges whether or not the electronic mail is from a user (transmission source address) having access authorization by referencing the user management table UT.

The module control function 22 controls the overall operation of the electronic mail automatic response function 20. When an electronic mail including a command is received from the command reception function 21, the module control function 22 interprets the command and designates an application module corresponding to the command as the execution destination of the command by referencing the module management table MT which manages the various application modules 23. The module control function 22 then acquires a processing result from the designated application module and outputs the processing result to the command response function 24.

The application modules 23 are modules capable of performing application processing, and can be arbitrarily connected to the main control section 11 in application units (module units). In the example in FIG. 3, the application modules 23 are operation-specific application modules corresponding to the types of operation, which are a sales management application module 23-1, a customer management application module 23-2 and a reservation management application module 23-3. These application modules 23 include an application processing section AP that performs application processing and a command processing section CM that executes a command. Results of processing performed by the application modules 23 are outputted to the module control function 22.

The command processing section CM in the application modules 23 acquires data required for processing corresponding to a command from the corresponding application processing section AP. In this instance, the application processing section AP of the sales management application module 23-1/customer management application module 23-2/reservation management application module 23-3 accesses the corresponding sales database DB1/customer database DB2/reservation database DB3, and after performing sales management processing/customer management processing/reservation management processing, provides the command processing section CM with a result of the processing. The command response function 24 receives a result of processing performed by the application modules 23 from the module control function 22, determines the processing result as a response to an inquiry regarding operation status, creates a reply (response) electronic mail (reply e-mail) wherein the response contents have been inserted into the text body and transmits the reply mail to the terminal device 5 via the wide-area communication section 18 and the Internet 2.

FIG. 4A is a diagram for describing the module management table MT.

The module management table MT is configured to include a "module name (type)" field, an "address" field, and an "other" field, and stores and manages the various application modules 23 connected to the main control section 11. When a new application module is additionally connected, the main control section 11 additionally registers the module identification information in the module management table MT in accordance with a registration instruction from the new application module. The "module name (type)" and the "address" are the identification information of the application modules 23. In the example in FIG. 4A, "Sales (sales)", "Customer (customer)", and "Reserve (reservation)" have been stored as the "module name (type)". The "address" indicates the storage locations of the application modules 23. When a connected application module 23 is deleted, the module identification information thereof in the module management table MT is also deleted in response.

FIG. 4B is a diagram for describing the user management table UT.

The user management table UT is configured to include a "user name" field, a "mail address" field, a "command execution authorization" field, and a "password" field, and stores and manages the information of users having access authorization to make inquiries regarding operation status by electronic mail. The "mail address" is an electronic mail address (transmission source address), and the "password" is secret code information attached to the user. The "command execution authorization" is a field where whether or not access authorization has been granted is set for each application module 23. For example, this field can be set such that the sales management application module 23-1 has access authorization but the customer management application module 23-2 does not have access authorization.

FIG. 5 is a diagram showing command syntax examples entered into the text body of electronic mail.

Each command is configured to include, for example, the type of operation and inquiry contents regarding the operation status. In the command syntax examples of FIGS. 5 (1) to (8), the sales management application module 23-1, the customer management application module 23-2, and the reservation management application module 23-3 have been connected as operation-specific application modules. The command "Sales. Flash. Report" in FIG. 5 (1) indicates "acquire sales flash report". The "Sales" herein indicates that the operation type is "sales management", and the "Flash. Report" herein indicates that the inquiry contents regarding operation status are "acquire flash report".

The command "Customer. Flash. Report" in FIG. 5 (2) indicates "acquire customer flash report", and the "Customer" herein indicates that the operation type is "customer management". The command "Reserve. Flash. Report" in FIG. 5 (3) indicates "acquire reservation flash report", and the "Reserve" herein indicates that the operation type is "reservation management". The command "Sales. Detail. Report" in FIG. 5 (4) indicates "acquire detailed sales report", and the "Detail. Report" herein indicates "acquire detailed report". The command "Customer. Detail. Report" in FIG. 5 (5) indicates "acquire detailed customer report", and the command "Reserve. Detail. Report" in FIG. 5 (6) indicates "acquire detailed reservation report".

The command "Sales. Detail. Report 100" in FIG. 5 (7) indicates "acquire detailed sales report in predetermined document format" in a case where a conversion application module (not shown) for converting a file to a file in a predetermined document format has been newly and additionally connected as an application module 23. Note that the "|" in FIG. 5 (7) is a vertical bar (pipe) indicating linkage (combination) between preceding and succeeding commands, and the "○○" indicates a predetermined document format, such as a general-purpose document format. As a result, linkage (combination) between the sales management application module 23-1 and the above-described conversion application module is specified. The command "Item.plu<PLU.TXT" in FIG. 5 (8) indicates "change unit price of item (PLU) in accordance with attached file PLU.TXT" in a case where an item change application module (not shown) has been newly and additionally connected as an application module 23. Note that the "<" herein is a redirect indicating that an attached file should be used.

FIG. 6 is a diagram of processing management tables DT that are referenced by the command processing section CM in the application modules 23.

In the example in FIG. 6, a sales management processing management table DT1, a customer management processing management table DT2, and a reservation management processing table DT3 are provided as the processing management table DT, corresponding to the sales management application module 23-1, the customer management application module 23-2, and the reservation management application module 23-3. The processing management tables DT1 to DT3 each include a "command" field and a "processing to be performed" field and store processing to be performed corresponding to, for example, the commands "Flash. Report" and "Detail. Report".

Next, the operational concept of the information processing device 1 according to the first embodiment will be described with reference to the flowcharts shown in FIG. 7 to FIG. 10. Here, each function described in the flowcharts is stored in a readable program code format and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium in addition to a recording medium.

Figure 7:
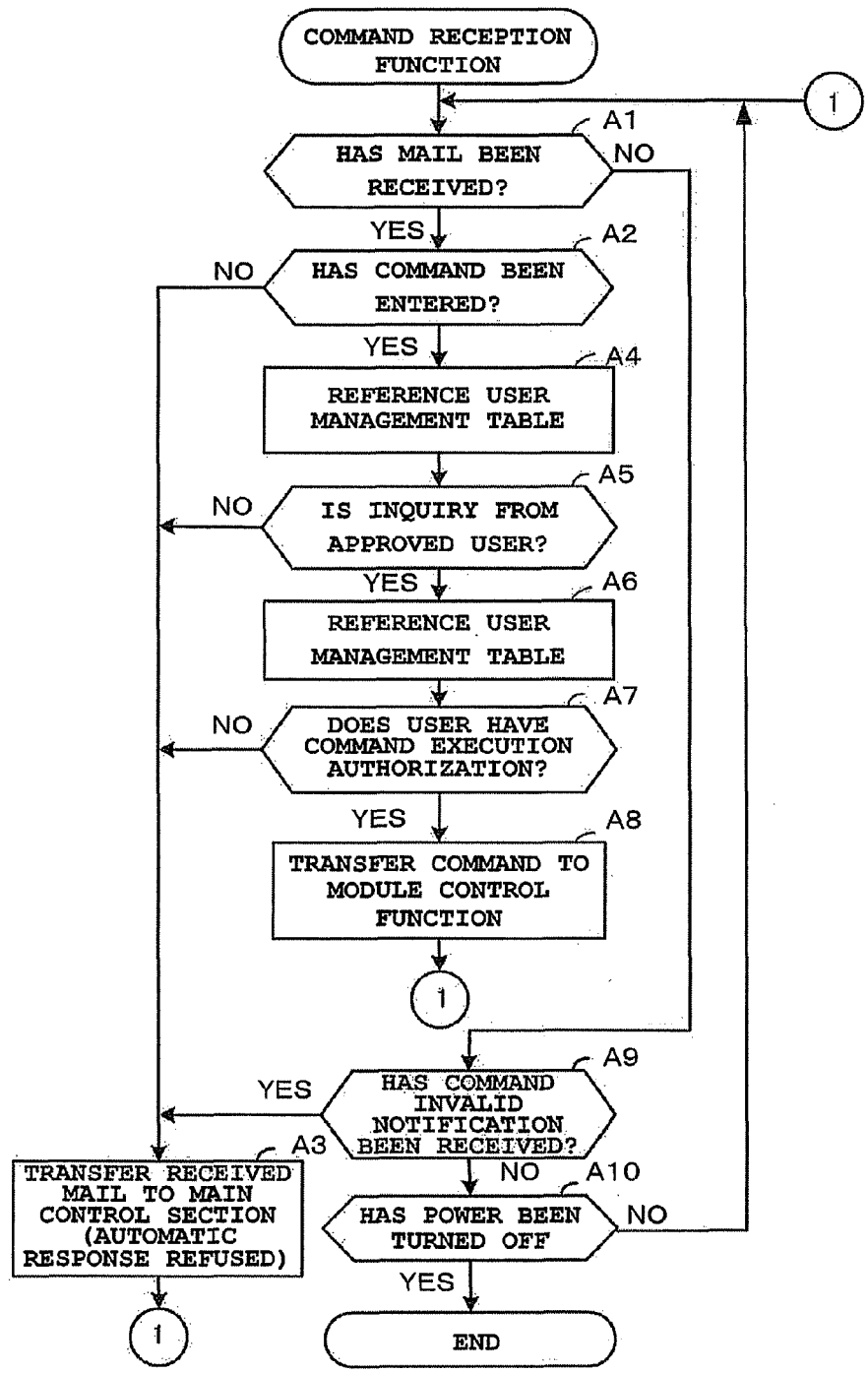
Figure 8:
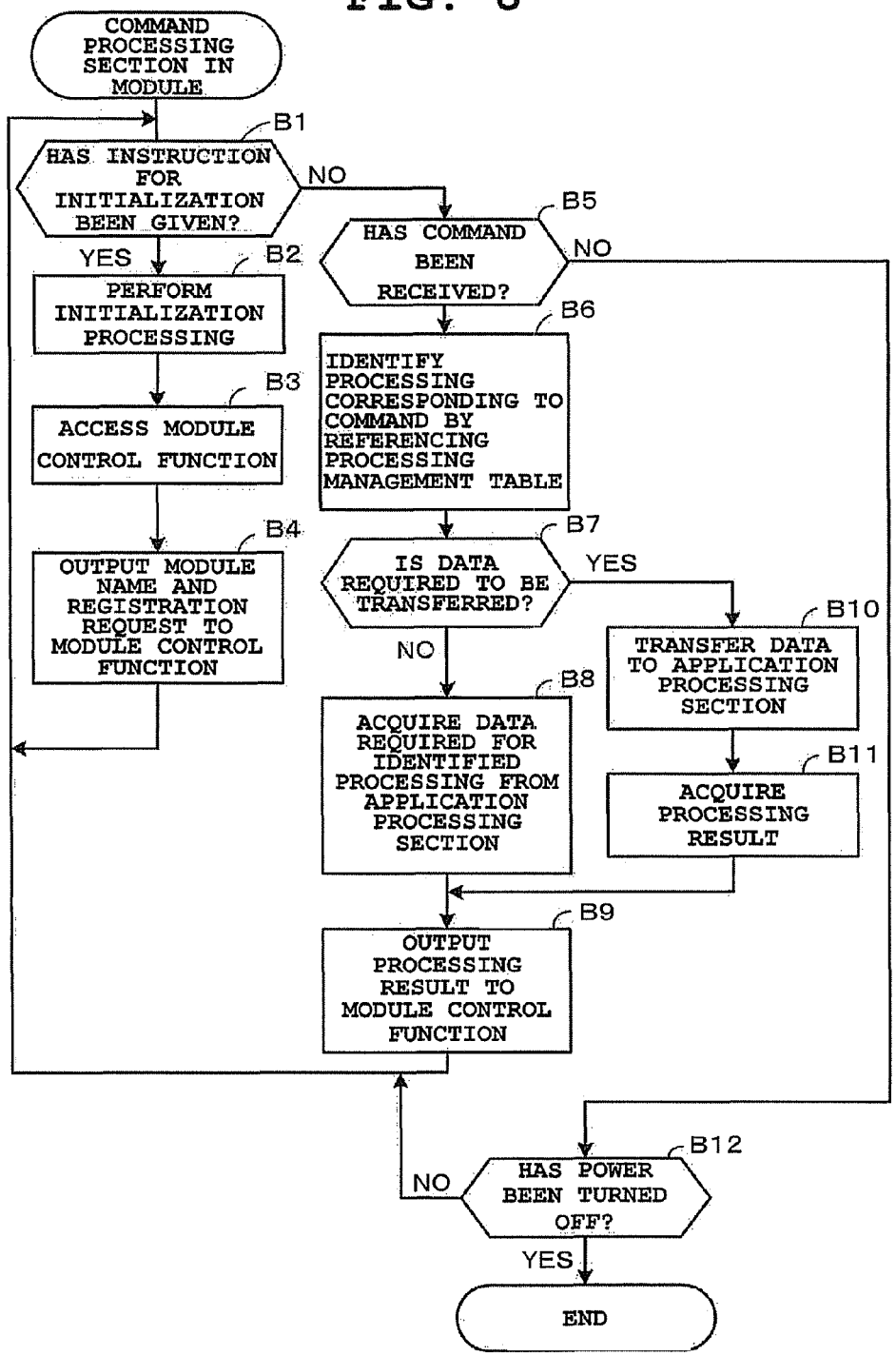
Figure 9:
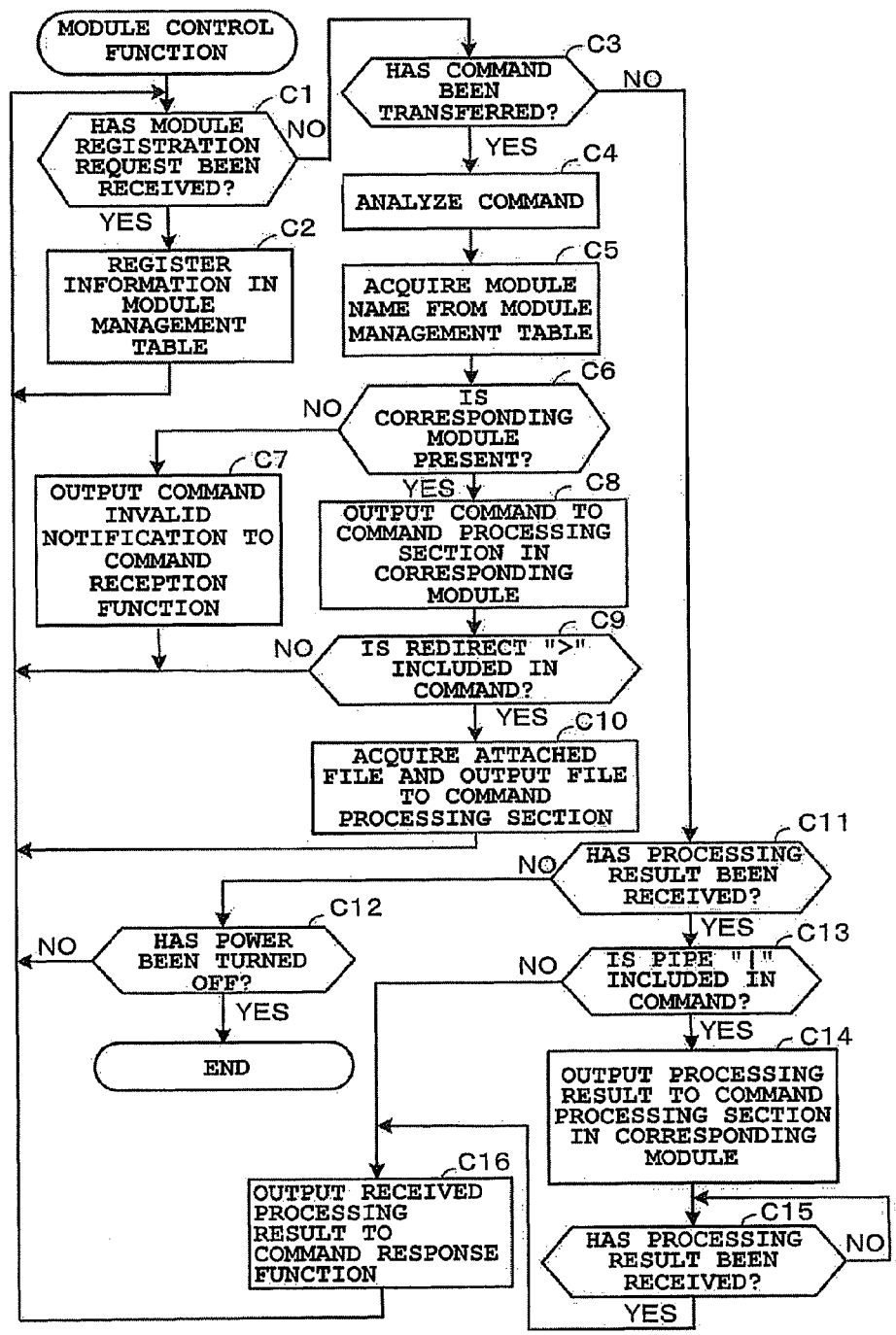
Figure 10:
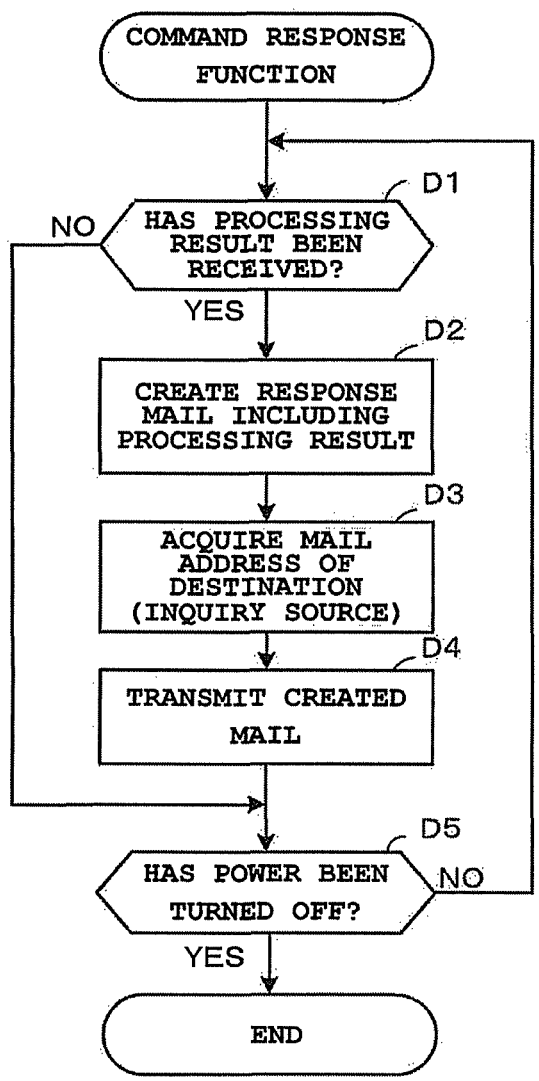

FIG. 7 to FIG. 10 are flowcharts for describing the operations of the electronic mail automatic response function 20 which are started in response to power being turned ON. That is, FIG. 7 is a flowchart for describing the operations of the command reception function 21, and FIG. 8 is a flowchart for describing the operations of the command processing section CM in the application modules 23. In addition, FIG. 9 is a flowchart for describing the operations of the module control function 22, and FIG. 10 is a flowchart for describing the operations of the command response function 24.

First, when a new application module 23 is additionally connected to the main control section 11, and a user operation giving an instruction to initialize the new application module 23 is performed (Step B1 in FIG. 8), the command processing section CM in the newly connected application module 23 starts predetermined initialization processing based on the new connection (Step B2), and accesses the module control function 22 (Step B3). Then, the command processing section CM outputs its own module name and a registration request for the module name to the module control function 22 (Step B4) and returns to the first Step B1.

The module control function 22 judges whether or not a registration request has been received from the newly connected application module 23 (Step C1 in FIG. 9), whether or not a command has been transferred from the command reception function 21 (Step C3), whether or not a processing result has been received from the application module 23 (Step C11), and whether or not a power OFF operation has been performed (Step C12). When judged that a power OFF operation has been performed (YES at Step C12), the module control function 22 exits the flow in FIG. 9. When judged that a power OFF operation has not been performed (NO at Step C12), the module control function 22 returns to Step C1.

When a registration request is received from the newly connected application module 23 (YES at Step C1), the module control function 22 additionally registers the "module name (type)", "address", and "other" in the module management table MT as information related to the application module 23 that is the registration request source (Step C2). Note that, when the connected application module 23 is deleted, the module control function 22 performs processing to delete information related to the application module 23 from the module management table MT in response to this deletion of the application module 23 (not shown in FIG. 8 and FIG. 9). The contents of the module management table MT is changed in this way based on the addition and deletion of the application modules 23.

Figure 11A:
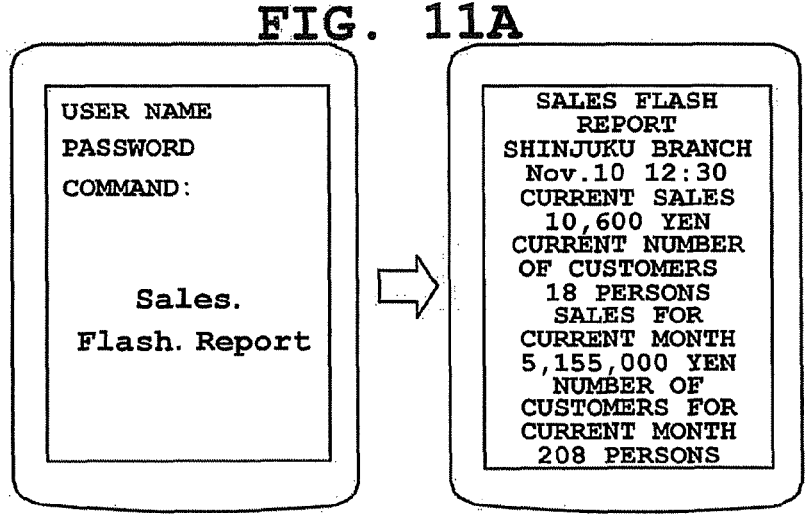
FIG. 11A to FIG. 11C are diagrams of a terminal screen showing input commands that are given when an inquiry regarding operation status is made in the terminal device 5, and a terminal screen when an inquiry result is received.
Figure 11B:
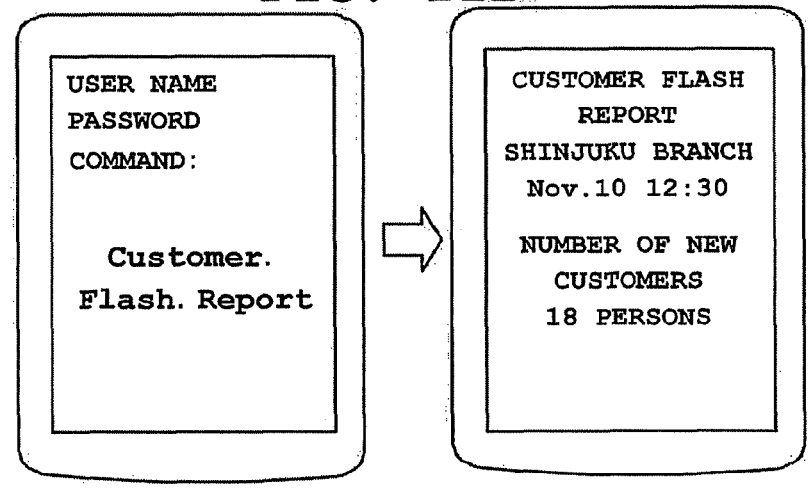
Figure 11C:
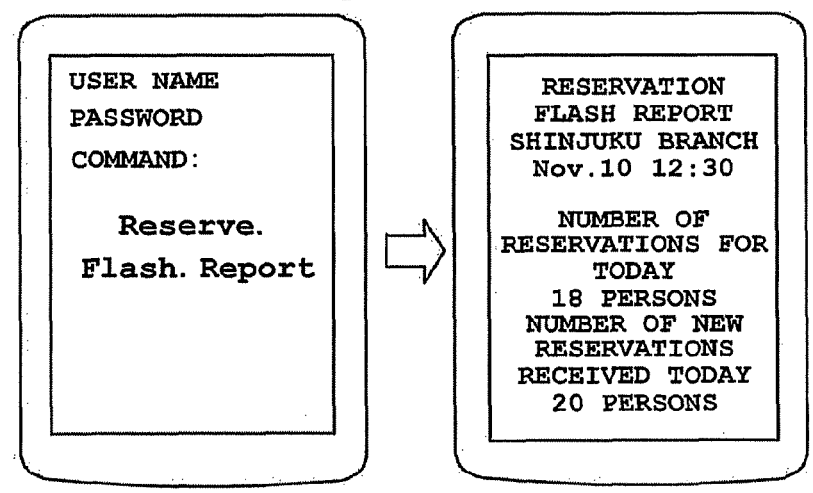

The command reception function 21 judges whether or not an electronic mail has been received (Step A1 in FIG. 7), whether or not a command invalid notification has been received from the module control function 22 (Step A9), and whether or not a power OFF operation has been performed (Step A10). When judged that a power OFF operation has been performed (YES at Step A10), the command reception function 21 exits the flow in FIG. 7. Conversely, when judged that a power OFF operation has not been performed (NO at Step A10), the command reception function 21 returns to Step A1. Also, when judged that an electronic mail has been received (YES at Step A1), the command reception function 21 judges whether or not a command has been entered into the text body of the electronic mail (Step A2). Here, FIG. 11A shows an example wherein "Sales. Flash. Report" has been entered as a command into the text body of the mail being created, and FIG. 11B shows an example wherein "Customer. Flash. Report" has been entered as a command into the text body of the mail being created. FIG. 11C shows an example wherein "Reserve. Flash. Report" has been entered as a command into the text body of the mail being created. In these examples, the user's own name and a password are entered before the command.

When judged that a command has not been entered into the text body of the received mail (NO at Step A2), the command reception function 21 judges that the received electronic mail is not an inquiry regarding operation status but an ordinary electronic mail. Then, the command reception function 21 transfers the received mail to the main control section 11 and instructs the main control section 11 to perform ordinary mail processing (Step A3). Conversely, when judged that an electronic mail including a command has been received (YES at Step A2), the command reception function 21 references the user management table UT based on the user name and the password acquired from the text body (Step A4), and judges whether or not the inquiry is from an approved user (Step A5).

When judged that the user name and the password do not match the user management table UT and the inquiry is not from an approved user (NO at Step A5), the command reception function 21 transfers the received mail to the main control section 11 to refuse automatic response to the inquiry, and instructs the main control section 11 to perform ordinary mail processing (Step A3). Conversely, when judged that the inquiry is from an approved user (YES at Step A5), the command reception function 21 acquires the mail address of the transmission source from the header of the electronic mail, references the user management UT (Step A6), and judges whether or not the user has command execution authorization (Step A7) When judged that the user does not have command execution authorization (NO at Step A7), the command reception function 21 transfers the received mail to the main control section 11 to refuse automatic response and instructs the main control section 11 to perform ordinary mail processing (Step A3). Conversely, when judged that the user has command execution authorization (YES at Step A7), the command reception function 21 transfers the received command to the module control function 22 (Step A8) and returns to Step A1.

Note that, in order to judge whether or not the user is an approved user at Step A5, the command reception function 21 judges whether or not the user name and the password match the user management table UT. However, a configuration may be adopted where the command reception function 21 further judges whether or not the mail address of the transmission source matches a mail address stored in the user management table UT, in order to judge whether or not the user is an approved user.

The module control function 22 analyzes, when a command transfer from the command reception function 21 is detected (YES at Step C3 in FIG. 9), an operation type in the command (Step C4). In this instance, when the interpreted command includes contents designating a combination of a plurality of application modules 23, or in other words, includes indicating linkage (combination) between preceding and succeeding commands, the module control function 22 interprets each command. Subsequently, the module control function 22 acquires the "module name (type)" from the module management table MT to collate the analysis result (operation type) and the contents of the module management table MT (Step C5).

Then, the module control function 22 compares the analysis result (operation type) with the "module name (type)" and judges whether or not the corresponding module name has been stored in the module management table MT, or in other words, whether or not the corresponding application module 23 is currently connected (Step C6). Here, when the command includes "|", the module control function 22 judges whether or not the corresponding plurality of application modules 23 are currently connected. When judged that the corresponding module 23 is not present, or in other words, is not connected (NO at Step C6), the module control function 23 outputs a command invalid notification to the command reception function 21 to invalidate the current command (Step C7) and returns to Step C1.

When the command invalid notification is received from the module control function 22 (YES at Step A9 in FIG. 7), the command reception function 21 transfers the received mail to the main control section 11 to refuse automatic response to the inquiry, and instructs the main control section 11 to perform ordinary mail processing (Step A3).

At Step C6, when it is judged, as a result of the analysis of the transferred command from the command reception function 21, that the application module 23 corresponding to the operation type in the command is connected, or in other words, information related to the corresponding application module 23 has been stored in the module management table MT (YES at Step C6 in FIG. 9), the module control function 11 outputs the corresponding command to the command processing section CM in the corresponding application module 23 (Step C8). For example, when the command is that shown in FIG. 11A, the module control function 11 outputs the command to the command processing section CM in the sales management application module 23-1. When the command is that shown in FIG. 11B, the module control function 11 outputs the command to the command processing section CM in the customer management application module 23-2. When the command is that shown in FIG. 11C, the module control function 11 outputs the command to the command processing section CM in the reservation management application module 23-3. When the command includes "|", the module control function 22 outputs corresponding commands to a plurality of application modules 23.

Then, the module control function 22 judges whether or not the command includes a redirect ">" (Step C9). When judged that the redirect ">" is included (YES at Step C9), the module control function 22 acquires a file attached to the electronic mail and outputs the acquired file to the command processing section CM in the corresponding application module 23 (Step C10). For example, the command "Item.plu<PLU.TXT" shown in FIG. 5 (8) includes ">". Therefore, the module control function 22 outputs the command and the attached file to the command processing section CM.

The command processing section CM in the application modules 23 judges whether or not an instruction to perform initialization has been received (Step B1 in FIG. 8), whether or not a command has been received from the module control function 22 (Step B5), and whether or not a power OFF operation has been performed (Step B12). When judged that a power OFF operation has been performed (YES at Step B12), the command processing section CM exits the flow in FIG. 8. When judged that a power OFF operation has not been performed (NO at Step B12), the command processing section CM returns to Step B1. When judged that a command has been received from the module control function 22 (YES at Step B5), the command processing section CM identifies a processing operation corresponding to the command by referencing its own processing management table DT (Step B6).

Then, the command processing section CM judges whether or not data (such as an attached file) is required to be transferred to the corresponding application processing section AP according to the identified processing operation (Step B7). When judged that data transfer is not required (NO at Step B7), the command processing section CM acquires data required for the identified processing operation from the corresponding application processing section AP (Step B8). For example, for the command "Sales. Flash. Report" in FIG. 11A, the command processing section CM acquires the current sales figure, the number of customers for today, the sales figure of the current month, and the number of customers for the current month from the sales management application processing section AP. For the command "Customer. Flash. Report" in FIG. 11B, the command processing section CM acquires the number of today's newly registered customers up to this point from the customer management application processing section AP. For the command "Reserve. Flash. Report" in FIG. 11C, the command processing section CM acquires the number of reservations for today and the number of new reservations received today from the reservation management application processing section AP. Then, the command processing section CM outputs the acquired data to the module control function 22, as a result of processing performed by the application processing section AP (Step B9), and returns to Step B1.

At Step 37, when judged that data such as an attached file is required to be transferred to the corresponding application processing section AP (YES at Step B7), the command processing section CM transfers the data to the corresponding application processing section AP (Step 310) and receives a processing result (Step B11). For example, when the command is requesting that the unit price of a single item be changed in accordance with an attached file, the command processing section CM transfers the attached file and receives data indicating that the change has been successfully made as the processing result. When the command is requesting the acquisition of a detailed sales report in a predetermined document format, the command processing section CM transfers the detailed sales report, and receives the detailed sales report that has been converted to the predetermined document format as the processing result. Then, the command processing section CM outputs the received processing result to the module control function 22 (Step B9), and returns to Step B1.

When the processing result is received from the application module 23 (YES at Step C11 in FIG. 9), the module control function 22 judges whether or not a pipe "|" is included based on the analysis of the transferred command at Step C4 (Step C13). When judged that the pipe "|" is not included (NO at Step C13), the module control function 22 outputs the received processing result to the command response function 24 (Step C16) and returns to Step C1. Conversely, when judge that the pipe "|" is included (YES at Step C13), the module control function 22 outputs the currently received processing result to the command processing section CM in an application module 23 corresponding to a command following "|" (Step C14), and waits to receive the processing result from this application module 23 (Step C15).

For example, in the case of the command "Sales. Detail. Report|○○" shown in FIG. 5 (7), the module control function 22 outputs a processing result (such as a detailed sales report) from the sales management application module 23-1 to the conversion application module in order to combine processing results from the sales management application module 23-1 and the conversion application module (not shown) for converting a file to a file in a predetermined document format, and then receives the processing result (the detailed sales report converted to the predetermined document format) from the conversion application module. When this processing result is received from the module defined after the pipe "|" (YES at Step C15), the module control function 22 outputs the processing result to the command response function 24 (Step C16) and returns to Step C1. Note that Step C13 to Step C15 have been described on the assumption that a single "|" is included in a command. However, when there is a plurality of "|", Step C13 to Step C15 are required to be repeated by the number of times corresponding to the number of "|".

The command response function 24 judges whether or not a processing result has been received from the module control function 22 (Step D1 in FIG. 10), and whether or not a power OFF operation has been performed (Step D5). When judged that a power OFF operation has been performed (YES at Step D5), the command response function 24 exits the flow in FIG. 10. Conversely, when judged that a power OFF operation has not been performed (NO at Step D5), the command response function 24 returns to Step D1. At Step D1, when judged that a processing result has been received from the module control function 22 (YES at Step D1), the command response function 24 creates a reply electronic mail including the processing result (Step D2), and after acquiring the mail address of the destination (inquiry source) (Step D3), transmits the created mail to the address (Step D4).

As a result, in the case of the command "Sales. Flash. Report" in FIG. 11A, the current sales figure, the number of today's customers up to this point, the sales figure for the current month, and the number of customers for the current month are displayed as a processing result on the terminal screen of the terminal device 5, following the title "sales flash report", the store name, and the current time. In the case of the command "Customer. Flash. Report" in FIG. 11B, the number of today's new customers up to this point is displayed as a processing result on the terminal screen of the terminal device 5, following the title "customer flash report", the store name, and the current time. In the case of the command "Reserve. Flash. Report" in FIG. 11C, the number of reservations for today and the number of new reservations received today are displayed as a processing result on the terminal screen of the terminal device 5, following the title "reservation flash report", the store name, and the current time.

As described above, in the information processing device 1 according to the present embodiment, when an electronic mail including a command making an inquiry regarding operation status is received from the terminal device 5 with an application module capable of performing application processing being arbitrarily connected to the information processing device 1, the information processing device 1 interprets the command in the electronic mail, designates an application module corresponding to the command as the execution destination of the command, creates a response electronic mail including a result of processing performed by the application module, and transmits the created response electronic mail to the terminal device 5. Therefore, by a new application module being added taking into consideration various circumstances such as the moves of competing stores, changes in clientele and the availability of reservations, the present invention can be used for many occasions. In addition, a flexible response to an inquiry regarding operation status by electronic mail can be actualized, which is very effective for business promotion and strategies.

Also, the information processing device 1 references the module management table MT based on a received command, and designates an application module 23 corresponding to the command as the execution destination of the command. Therefore, the application modules 23 can be managed exclusively using the module management table MT, by which the management of the application modules 23 is facilitated.

Moreover, when a new application module 23 is additionally connected, the information processing device 1 registers and manages the module identification information in the module management table MT in response to a registration instruction from the new application module 23. Therefore, module identification information can be registered when the application module 23 is additionally connected, in accordance with an instruction from the application module 23. As a result of this configuration, the registration of module identification information is unfailingly made.

Furthermore, when a received command has contents including "|" that designates the combination of a plurality of application modules 23, the information processing device 1 successively designates the plurality of application modules 23 as the execution destination of the command in accordance with the contents of the command, and responds by an electronic mail including results of processing successively performed by the plurality of application modules 23. Therefore, a plurality of application modules 23 can be used in combination, and responses to various inquiries can be made using existing application modules 23.

Still further, when a received command has contents instructing the use of a file attached to the electronic mail, the information processing device 1 can perform processing using the attached file.

Yet still further, electronic mail is received from the terminal device 5 on a condition that the electronic mail address of the terminal device 5 is an address having access authorization set in advance. As a result of this configuration, security management can be performed.

Yet still further, access authorization is set for each application module 23. Therefore, security management can be performed for each application module 23 based on an inquiry source, by which more detailed management can be performed.

Yet still further, the application module 23 includes the application processing section AP and the command processing section CM. Therefore, command processing can be set for each application processing section AP, and the connection with the module control function 22 is also facilitated.

Yet still further, the application modules 23 are operation-specific application modules corresponding to operation types, and the command includes an operation type and inquiry contents regarding operation status. Therefore, the processing can be performed in units of operations, and the association between the command and the application module 23 can be facilitated.

Yet still further, similar effects can be achieved in an information processing system including the terminal device 5 that makes in inquiry regarding operation status and the information processing device 1 connected to the terminal device 5 via a network, and a flexible response to an inquiry regarding operation status by electronic mail, which is very effective for business promotion and strategies, can be actualized.

In the above-described embodiment, the electronic mail automatic response function 20 is configured to include the blocks: command reception function 21, module control function 22, various application modules 23, and the command response function 24. However, this division into blocks is not limited thereto and can be arbitrarily determined. In addition, the application modules 23 are not limited to operation-specific application modules (operation application modules) corresponding to operation types, and can be arbitrarily determined. Moreover, a portion of the functions of the command processing section CM that executes commands may be performed by the module control function 22.

Furthermore, in the above-described embodiment, the present invention has been applied to store operation in business. However, the present invention is not limited thereto, and may be applied to, for example, general office work involving data that changes by the minute, regardless of the type of business.

Still further, in the above-described embodiment, the present invention has been applied to a POS terminal as the information processing device 1. However, the present invention may be applied to a PC, a Personal Digital Assistant (PDA), etc.

Yet still further, the "devices" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. A sales data processing device for processing sales data comprising:
    a memory to store computer executable instructions;
    a processor that executes the computer executable instructions to perform operations comprising:
    storing various sales data of stores;
    judging, when an electronic mail is received from an external terminal device, and when the received mail is a mail of an inquiry regarding sales data in the sales data processing device and is a mail received from a terminal device of a person involved with the stores, inquiry contents thereof;
    first acquiring, when the inquiry contents judged by the judging are an inquiry of a flash request, by reading out, as brief flash information, only data limited in advance from the various sales data stored by the storing;
    second acquiring, when the inquiry contents judged by the judging are an inquiry of a details request, detailed information including detailed data based on the various sales data stored by the storing; and
    transmitting to an address of the inquiry's source by creating a brief flash mail including the brief information acquired by the first acquiring or a detailed mail including the detailed information acquired by the second acquiring.

2. The sales data processing device according to claim 1, wherein the inquiry contents includes a request type for requesting a data type of a sales type, a customer type or a reservation type which are required in the various sales data stored by the sales data processing device, as well as the flash request and the details request,
    wherein the first acquiring acquires, by reading out, as brief flash information, only data limited in advance further by the data type in the various sales data, and
    wherein the second acquiring, by reading out, detailed information further based on various data of the data type in the various sales data.

3. The sales data processing device according to claim 2, wherein the first acquiring acquires, by limiting to, a current sales figure or a sales figure of a current month when the data type is the sales type; acquires, by limiting to, a number of newly-registered customers when the data type is the customer type; and acquires, by limiting to, a number of reservations for a current day, or a number of newly-received reservations when the data type is the reservation type.

4. The sales data processing device according to claim 1, wherein, when the inquiry contents are an inquiry of a details request and includes a request for attaching a file, the transmitting creates a report file including the detailed information acquired by the second acquiring, in a predetermined format; and transmits the created report file as an electronic mail attachment.

5. The sales data processing device according to claim 1, wherein, when the inquiry contents are an inquiry of a details request and includes a request for designating an output format, the transmitting creates a report by converting the detailed information acquired by the second acquiring, to the designated output format; and transmits an electronic mail including the created report.

6. A sales data processing device for processing sales data comprising:
    a memory to store computer executable instructions;
    a processor that executes the computer executable instructions to perform operations comprising:
    storing various sales data of stores;
    judging, when an electronic mail is received from an external terminal device, and when the received mail is a mail of an inquiry regarding sales data in the sales data processing device and is a mail received from a terminal device of a person involved with the stores, inquiry contents thereof;

first acquiring, when the inquiry contents judged by the judging are an inquiry of a sales flash request, by reading out, as brief sales flash information, only sales data limited in advance from various sales information included in the various sales data stored by the storing;

second acquiring, when the inquiry contents judged by the judging are an inquiry of a reservation flash request, by reading out, as brief reservation flash information, only reservation information limited in advance from various reservation information included in the various sales data stored by the storing; and transmitting to an address of the inquiry's source by creating a sales flash mail including the sales flash information acquired by the first acquiring or a reservation flash mail including the reservation flash information acquired by the second acquiring.

7. The sales data processing device according to claim 6, wherein the first acquiring acquires, by limiting to, a current sales figure or a sales figure of a current month; and the second acquiring acquires, by limiting to, a number of reservations for a current day or a number of newly-received reservations.

8. The sales data processing device according to claim 1, wherein the brief flash mail is a brief mail that is limited to information with an amount of which the information can be displayed on a display screen of the terminal device of the inquiry's source.

9. The sales data processing device according to claim 1,
wherein the received mail of an inquiry includes authentication information indicating that the terminal device of the inquiry's source is a terminal device of a person involved with the stores, and wherein the judging judges whether the received mail is a mail received from a terminal device of an approved person involved with the stores based on the authentication information included in the received mail of an inquiry; and judges, when the received mail is a mail of an inquiry regarding sales data in the sales data processing device and is a mail received from a terminal device of an approved person involved with the stores, inquiry contents thereof.

10. A non-transitory computer-readable storage medium having stored thereon a program that is executable by a computer of a sales data processing device for processing sales data, the program being executable by the computer to perform functions comprising:

processing for storing various sales data of stores in a storage;

processing for judging, when an electronic mail is received from an external terminal device, and when the received mail is a mail of an inquiry regarding sales data in the sales data processing device and is a mail received from a terminal device of a person involved with the stores, inquiry contents thereof;

processing for acquiring, when the judged inquiry contents are an inquiry of a flash request, by reading out, as brief flash information, only data limited in advance from the various sales data stored in the storage;

processing for acquiring, when the judged inquiry contents are an inquiry of a details request, detailed information including detailed data based on the various sales data stored in the storage; and processing for transmitting to an address of the inquiry's source by creating a brief flash mail including the acquired brief information or a detailed mail including the acquired detailed information.

11. A non-transitory computer-readable storage medium having stored thereon a program that is executable by a computer of a sales data processing device, the program being executable by the computer for processing sales data to perform functions comprising: processing for storing various sales data of stores in a storage;

processing for judging, when an electronic mail is received from an external terminal device, and when the received mail is a mail of an inquiry regarding sales data in the sales data processing device and is a mail received from a terminal device of a person involved with the stores, inquiry contents thereof;

processing for acquiring, when the judged inquiry contents are an inquiry of a sales flash request, by reading out, as brief sales flash information, only sales data limited in advance from various sales information included in the various sales data stored in the storage;

processing for acquiring, when the judged inquiry contents are an inquiry of a reservation flash request, by reading out, as brief reservation flash information, only reservation information limited in advance from the various reservation information included in the various sales data stored in the storage; and processing for transmitting to an address of the inquiry's source by creating a sales flash mail including the acquired sales flash information or a reservation flash mail including the acquired reservation flash information.

* * * * *